United States Patent
Shao et al.

(10) Patent No.: US 12,269,171 B2
(45) Date of Patent: Apr. 8, 2025

(54) INDUSTRIAL INTERNET OF THINGS SYSTEMS FOR MONITORING COLLABORATIVE ROBOTS WITH DUAL IDENTIFICATION, CONTROL METHODS AND STORAGE MEDIA THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Lei Zhang, Chengdu (CN); Yongzeng Liang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 157 days.

(21) Appl. No.: 18/314,463

(22) Filed: May 9, 2023

(65) Prior Publication Data
US 2023/0271325 A1    Aug. 31, 2023

(30) Foreign Application Priority Data
Feb. 7, 2023   (CN) .......................... 202310098240.9

(51) Int. Cl.
| | |
|---|---|
| B25J 9/16 | (2006.01) |
| B25J 19/02 | (2006.01) |
| G16Y 40/10 | (2020.01) |

(52) U.S. Cl.
CPC ........... *B25J 9/1674* (2013.01); *B25J 9/1671* (2013.01); *B25J 19/023* (2013.01); *G16Y 40/10* (2020.01)

(58) Field of Classification Search
None
See application file for complete search history.

(56) References Cited

U.S. PATENT DOCUMENTS

| | | | |
|---|---|---|---|
| 2020/0276698 A1 | 9/2020 | Ding et al. | |
| 2022/0084228 A1 | 3/2022 | Gorban et al. | |

FOREIGN PATENT DOCUMENTS

| | | |
|---|---|---|
| CN | 106541419 | 3/2017 |
| CN | 106546170 | 3/2017 |

(Continued)

OTHER PUBLICATIONS

Ma, Hongwei et al., Research on depth vision based mobile robot autonomous navigation in underground coal mine, Journal of China Coal Society, 45(6): 2193-2206, 2020.

(Continued)

*Primary Examiner* — Jonathan L Sample
*Assistant Examiner* — Alan Lindsay Ostrow
(74) *Attorney, Agent, or Firm* — Runzhi Lai (57) ABSTRACT

The present disclosure provides an Industrial Internet of Things system for monitoring a collaborative robot with dual identification and a control method thereof. The Industrial Internet of Things includes a user platform, a service platform, a management platform and a sensing network platform and an object platform connected in sequence, and the control method comprises: monitoring a target collaborative robot on a production line, obtaining monitoring data, the monitoring data including at least one of image information of the target collaborative robot and displacement sensor data of the target collaborative robot; and processing the monitoring data.

7 Claims, 6 Drawing Sheets

(56) References Cited

FOREIGN PATENT DOCUMENTS

| CN | 107014457 | 8/2017 |
| CN | 112949439 A | 6/2021 |
| KR | 101907964 | 10/2018 |
| WO | 2022068274 A1 | 4/2022 |

OTHER PUBLICATIONS

Li, Ming et al., RGB-D Image-based Pose Estimation with Monte Carlo Localization, IEEE, 109-114, 2018.
Notification to Grant Patent Right for Invention in Chinese Application No. 202310098240.9 mailed on Jun. 24, 2024, 5 pages.

```
510
Determining, based on historical monitoring data collected
during multiple processing cycles, a first confidence and a
second confidence of each of the key moments by a preset
approach 520
Adjusting a corresponding key moment based on the first
confidence and the second confidence of each the key moment
```

INDUSTRIAL INTERNET OF THINGS SYSTEMS FOR MONITORING COLLABORATIVE ROBOTS WITH DUAL IDENTIFICATION, CONTROL METHODS AND STORAGE MEDIA THEREOF

CROSS-REFERENCE TO RELATED APPLICATIONS

This application claims priority of Chinese Patent Application No. 202310098240.9, filed on Feb. 7, 2023, the contents of which are hereby incorporated by reference to its entirety.

TECHNICAL FIELD

The present disclosure relates to the field of an Industrial Internet of Things, and in particular to an Industrial Internet of Things system for monitoring a collaborative robot with dual identification, control method and storage medium thereof.

BACKGROUND

A collaborative robot is a robot that is designed to work collaboratively with humans in a common workspace. The collaborative robot can give full play to human agency and has the high efficiency of a robot, which can effectively improve the efficiency of work completion. In addition, the collaborative robot has several features such as small size, low cost, safety and ease of use, automatic programming, and ease of operation, so the use of the collaborative robot has become an industry trend.

The collaborative robot is highly dependent on automatic control. Therefore, monitoring the collaborative robot and correcting the operation of the collaborative robot is the key to using the collaborative robot. A displacement sensor can monitor and adjust the operation of the collaborative robot. However, the displacement sensor is prone to baseline shift and zero-drift of data after long-term operation, having an impact on the operation adjustment of the collaborative robot.

Therefore, it is desirable to provide an Industrial Internet of Things system for monitoring a collaborative robot, control method, and storage medium thereof that can easily and accurately determine whether the collaborative robot is working normally and adjust the operation of the collaborative robot to improve production efficiency.

SUMMARY

One or more embodiments of the present disclosure provide an Industrial Internet of Things system for monitoring a collaborative robot with dual identification, wherein the system includes: a monitoring module and a processing module; the monitoring module being configured to monitor a target collaborative robot on a production line, obtaining monitoring data, the monitoring data including at least one of image information of the target collaborative robot and displacement sensor data of the target collaborative robot; and the processing module being configured to process the monitoring data.

One or more embodiments of the present disclosure provide an Industrial Internet of Things system for monitoring a collaborative robot with dual identification, the Industrial Internet of Things system includes: a user platform, a service platform, a management platform, a sensing network platform and an object platform connected in sequence, wherein the monitoring module is acted upon by the sensing network platform and the processing module is acted upon by the service platform and the management platform, the management platform includes: a selection module configured to select at least one key moment from a processing cycle of the target collaborative robot; the processing cycle being a processing process of the target collaborative robot for a workpiece; the key moment being a moment in the processing cycle when the target collaborative robot is stationary; a space module configured to establish a collaborative robot space and to establish a key point of the collaborative robot in the collaborative robot space; the key point including a point of a joint of the collaborative robot; a benchmark module configured to take coordinates of the key point of the target collaborative robot in the collaborative robot space at the key moment in a standard processing situation as benchmark coordinates; an acquisition module configured to obtain first coordinates and second coordinates via the sensing network platform; the first coordinates being coordinates of the key point of the target collaborative robot in the collaborative robot space at the key moment in a production processing situation, obtained from the image information; the second coordinates being coordinates of the key point of the target collaborative robot in the collaborative robot space at the key moment in a production processing situation, obtained from the displacement sensor data; and a calculation module configured to monitor a work situation of the target collaborative robot based on a difference between the first coordinates, the second coordinates and the benchmark coordinates at the same the key point at the same key moment, and to send the work situation to the user platform to display to the user via the service platform.

In some embodiments, the calculation module is further used to determine, based on historical monitoring data collected during multiple processing cycles, a first confidence and a second confidence of each of the key moments by a preset method; and adjusting a corresponding key moment based on the first confidence and the second confidence of each the key moment.

One or more embodiments of the present disclosure provide a control method for an Industrial Internet of Things system for monitoring a collaborative robot with dual identification, the control method is used for an Industrial Internet of Things system for monitoring a collaborative robot with dual identification, the control method includes: monitoring a target collaborative robot on a production line, obtaining monitoring data, the monitoring data including at least one of image information of the target collaborative robot and displacement sensor data of the target collaborative robot; and processing the monitoring data.

One embodiment of the present disclosure provides a non-transitory computer-readable storage medium, including a set of instructions, wherein when executed by a processor, the control method for an Industrial Internet of Things system for monitoring a collaborative robot with dual identification as described in any of the above embodiments is implemented.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein.

DETAILED DESCRIPTION

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the preceding or following operations is not necessarily performed in order to accurately. Instead, the operations may be processed in reverse order or simultaneously. Moreover, one or more other operations may be added to the flowcharts. One or more operations may be removed from the flowcharts.

Figure 1:
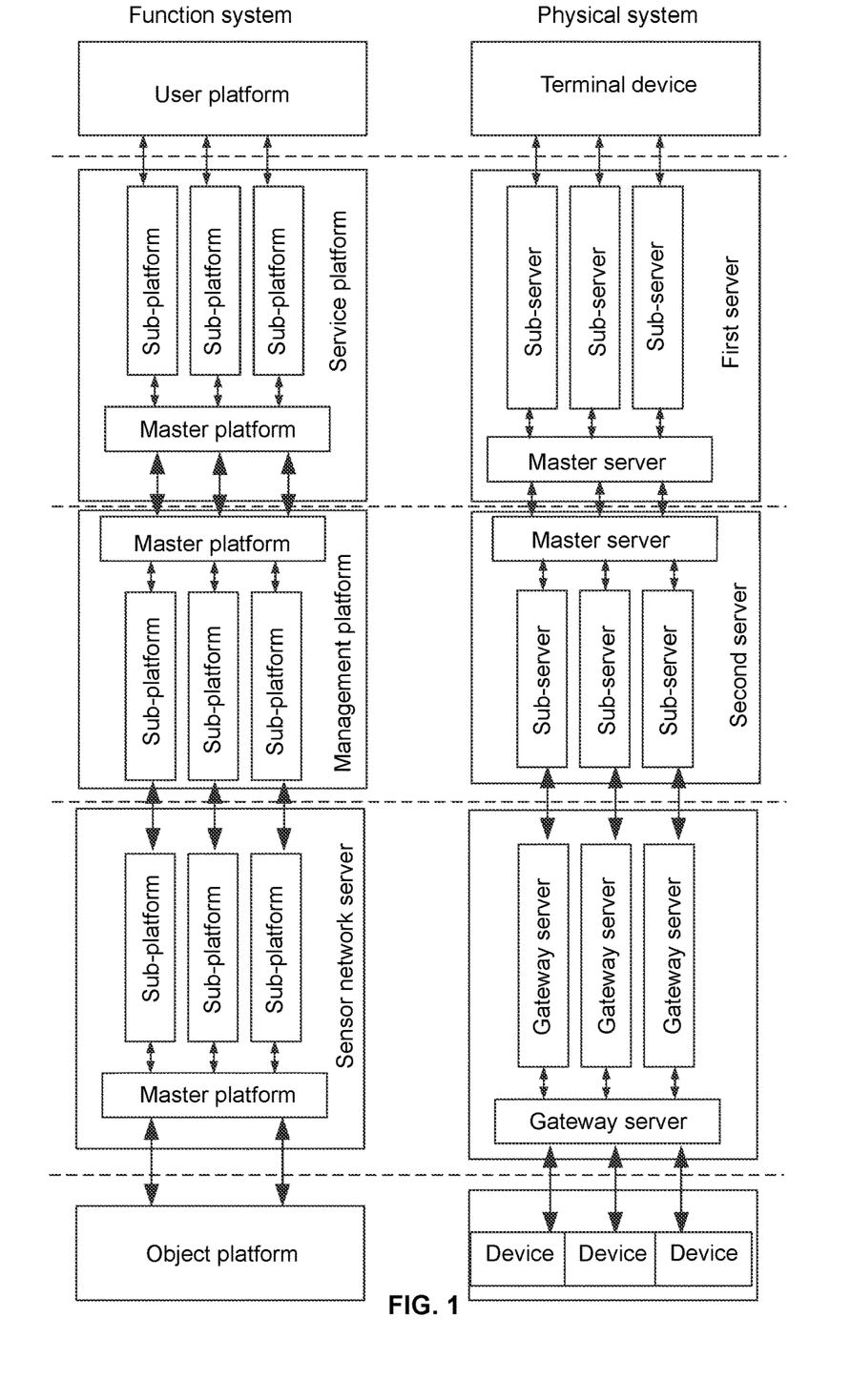
FIG. 1 is a schematic diagram illustrating an Industrial Internet of Things system for monitoring a collaborative robot with dual identification, according to some embodiments of the present disclosure.

FIG. 1 is a schematic diagram illustrating an Industrial Internet of Things system for monitoring a collaborative robot with dual identification, according to some embodiments of the present disclosure. As shown in FIG. 1, the Industrial Internet of Things system for monitoring a collaborative robot with dual identification includes: a user platform, a service platform, a management platform, a sensing network platform and an object platform that interact in sequence.

The user platform may be a platform for interacting with a user. In some embodiments, the user platform may be configured as a terminal device. In some embodiments, the user platform may receive requests and/or instructions input by the user (e.g., instructions to obtain monitoring data, etc.). In some embodiments, the user platform may interact with the service platform. For example, the user platform may receive data from the service platform (e.g., a work situation of a target collaborative robot) and display it via a terminal device.

The service platform may be a platform for providing an input and output service to the user. The service platform may be used to receive and transmit data and/or information. In some embodiments, the service platform may be in a post-split arrangement. The post-split arrangement means that the service platform has a master platform and multiple sub-platforms. The master platform may store and process different types of data sent by a lower level platform (e.g., the management platform), and the multiple sub-platforms may transmit data from the master platform with different types of data to an upper level platform (e.g., the user platform). In some embodiments, the service platform may include a service master platform and at least two service sub-platforms. For example, the data that the service master platform receives from the management platform may include benchmark data of a collaborative robot, coordinate data obtained by image information processing, coordinate data obtained by displacement sensor detection, and work situation determination data of the collaborative robot. These different data may be sent to the user platform via different service sub-platforms. In some embodiments, the service platform may be configured as a first server. The service master platform may be configured as a master server in the first server, and the service sub-platforms may be configured as sub-servers in the first server. Each sub-platform may correspond to a sub-server. With the service platform, the efficiency of transmitting data can be improved on the one hand, and on the other hand, it is easy for the user platform to filter the data for presentation.

The management platform may be a platform that provides perceptual management and control management functions for an Industrial Internet of Things system for monitoring a collaborative robot with dual identification. The management platform may be arranged in a front-split arrangement. The front-split arrangement means that the management platform includes a master platform and multiple sub-platforms. The multiple sub-platforms store and process different types of data sent from a lower level platform (e.g., the sensing network platform) separately. The master platform stores and processes the data from the multiple sub-platforms in aggregate and transmits the data to an upper level platform (e.g., the service platform). In some embodiments, the management platform may include a management master platform and at least two management sub-platforms. For example, one management sub-platform may obtain image information and process the processed image information as first coordinates. Another management sub-platform may obtain displacement sensor data and process the processed displacement sensor data as second coordinates. The management master platform may receive the first coordinates and the second coordinates sent by the management sub-platforms. In some embodiments, the management platform may be configured as a second server. The management master platform may be configured as a master server in the second server, and the management sub-platform may be configured as a sub-server in the second server. Each sub-platform may correspond to a sub-server.

In some embodiments, the management master platform may include a selection module, a space module, a benchmark module, an acquisition module, and a calculation module.

The selection module may be configured to select at least one key moment from a processing cycle of the target collaborative robot; the processing cycle being a processing process of the target collaborative robot for a workpiece; the key moment being a moment in the processing cycle when the target collaborative robot is stationary. For more information about determining the key moment, please refer to FIG. 4 and its related description.

The space module may be configured to establish a collaborative robot space and to establish a key point of the collaborative robot in the collaborative robot space; the key point including a point of a joint of the collaborative robot. For more information about establishing the key point of the collaborative robot, please refer to FIG. 4 and its related description.

The benchmark module may be configured to take coordinates of the key point of the target collaborative robot in the collaborative robot space at the key moment in a standard processing situation as benchmark coordinates. For more information about determining the benchmark coordinates, please refer to FIG. 4 and its related description.

The acquisition module may be configured to obtain first coordinates and second coordinates via the sensing network platform; the first coordinates being coordinates of the key point of the target collaborative robot in the collaborative robot space at the key moment in a production processing situation, obtained from the image information; the second coordinates being coordinates of the key point of the target collaborative robot in the collaborative robot space at the key moment in a production processing situation, obtained from the displacement sensor data. For more information about determining the first coordinates and second coordinates, please refer to FIG. 4 and its related description.

The calculation module may be configured to monitor a work situation of the target collaborative robot based on a difference between the first coordinates, the second coordinates and the benchmark coordinates at the same the key point at the same key moment, and to send the work situation to the user platform to display to the user via the service platform. For more information about monitoring the work situation of the target collaborative robot, please refer to FIG. 4 and its related description.

The sensing network platform may be a platform for processing, storing, and transmitting data and/or information. In some embodiments, the sensing network platform may be in a post-split arrangement. In some embodiments, the sensing network platform may include a sensing network master platform and at least two sensing network sub-platforms. The sensing network master platform may receive image information of the target collaborative robot and displacement sensor data of the target collaborative robot; the different sensing network sub-platforms send the image information and the displacement sensor data to the management platform, respectively. In some embodiments, the sensing network master platform and the sensing network sub-platforms may be configured as gateway servers, respectively. Each sub-platform may correspond to a gateway server.

The object platform may be a functional platform for obtaining data and/or information related to an object. The object may be a target collaborative robot. In some embodiments, the object platform may be configured as at least one device for collecting data related to the target collaborative robot. For example, a dual camera, a displacement sensor configured at a joint of the target collaborative robot. In some embodiments, the object platform may send the image information of the target collaborative robot and the displacement sensor data of the target collaborative robot to the sensing network platform.

It should be noted that the above description of the Industrial Internet of Things system for monitoring a collaborative robot with dual identification is for descriptive convenience only and does not limit the present disclosure to the scope of the embodiments cited. It can be understood that for those skilled in the art, after understanding the principle of the system, it may be possible to make any combination of individual platforms or constitute subsystems to connect to other platforms without departing from this principle. For example, the management platform, the user platform, the service platform, the sensing network platform, and the object platform disclosed in FIG. 1 may be different platforms in one system, or one platform may implement the functions of two or more of the above platforms.

Figure 2:
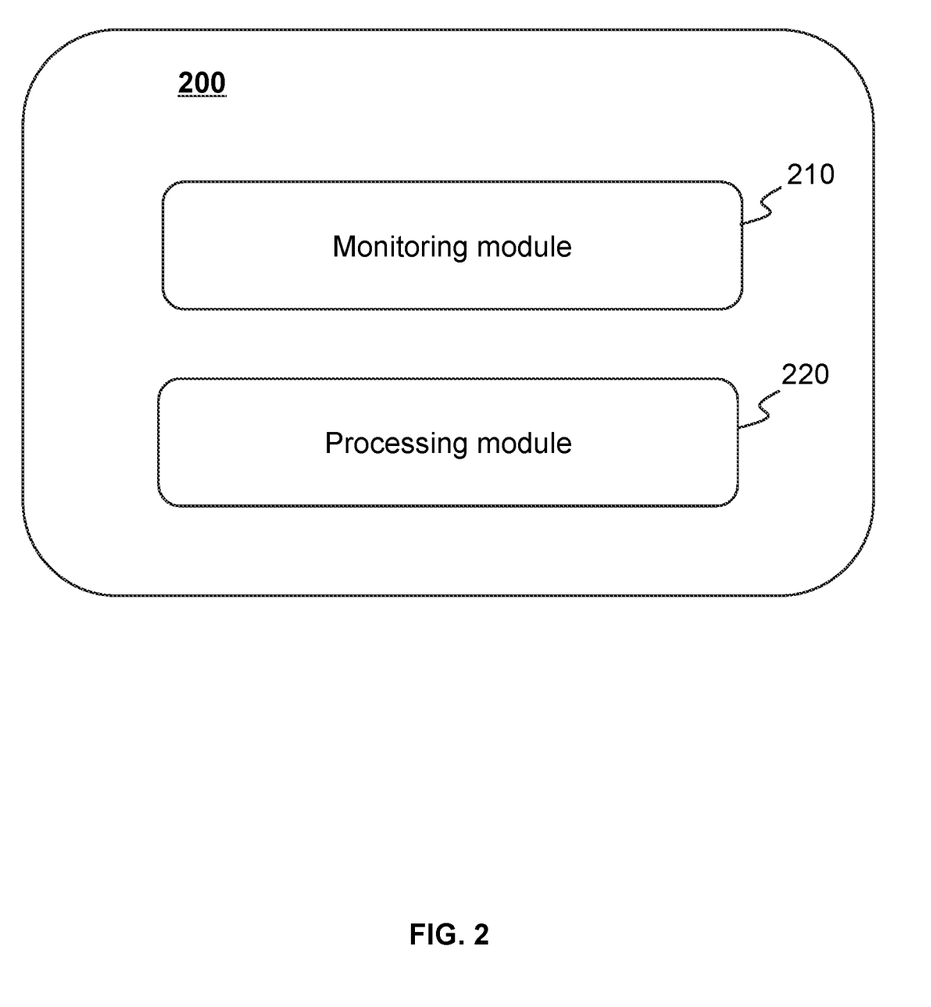
FIG. 2 is a module diagram illustrating an exemplary Industrial Internet of Things system for monitoring a collaborative robot with dual identification, according to some embodiments of the present disclosure.

FIG. 2 is a module diagram illustrating an exemplary Industrial Internet of Things system for monitoring a collaborative robot with dual identification, according to some embodiments of the present disclosure.

As shown in FIG. 2, the Industrial Internet of Things system 200 for monitoring a collaborative robot with dual identification may include a monitoring module 210 and a processing module 220.

The monitoring module 210 may be used to monitor a target collaborative robot on a production line and obtain monitoring data. In some embodiments, the monitoring data may include at least one of image information of the target collaborative robot and displacement sensor data of the target collaborative robot. For more information about the image information, displacement sensor data, please refer to FIG. 3 and its related description. In some embodiments, the monitoring module may be acted upon by the sensing network platform. For more information about the sensing network platform, please refer to FIG. 1 and its related description.

The processing module 220 may be used to process the monitoring data. For more information about the processing of the monitoring data, please refer to FIG. 3 and its related description. In some embodiments, the processing module may be acted upon by the service platform and the management platform. For more information about the service platform and the management platform, please refer to FIG. 1 and its related description.

It should be understood that the system shown in FIG. 2 and its modules can be implemented using a variety of approaches.

It should be noted that the above description of the Industrial Internet of Things system for monitoring a collaborative robot with dual identification is for descriptive convenience only and does not limit the present disclosure to the scope of the embodiments cited. It can be understood that for those skilled in the art, after understanding the principle of the system, it may be possible to make any combination of individual platforms or constitute subsystems to connect to other platforms without departing from this principle. In some embodiments, the monitoring module 210, the processing module 220 disclosed in FIG. 2 may be different modules in one system, or one module may implement the functions of the two modules described above. For example, each module may share a common memory module, and each module may also have its own memory module. Variations are within the scope of protection of the present disclosure.

Figure 3:
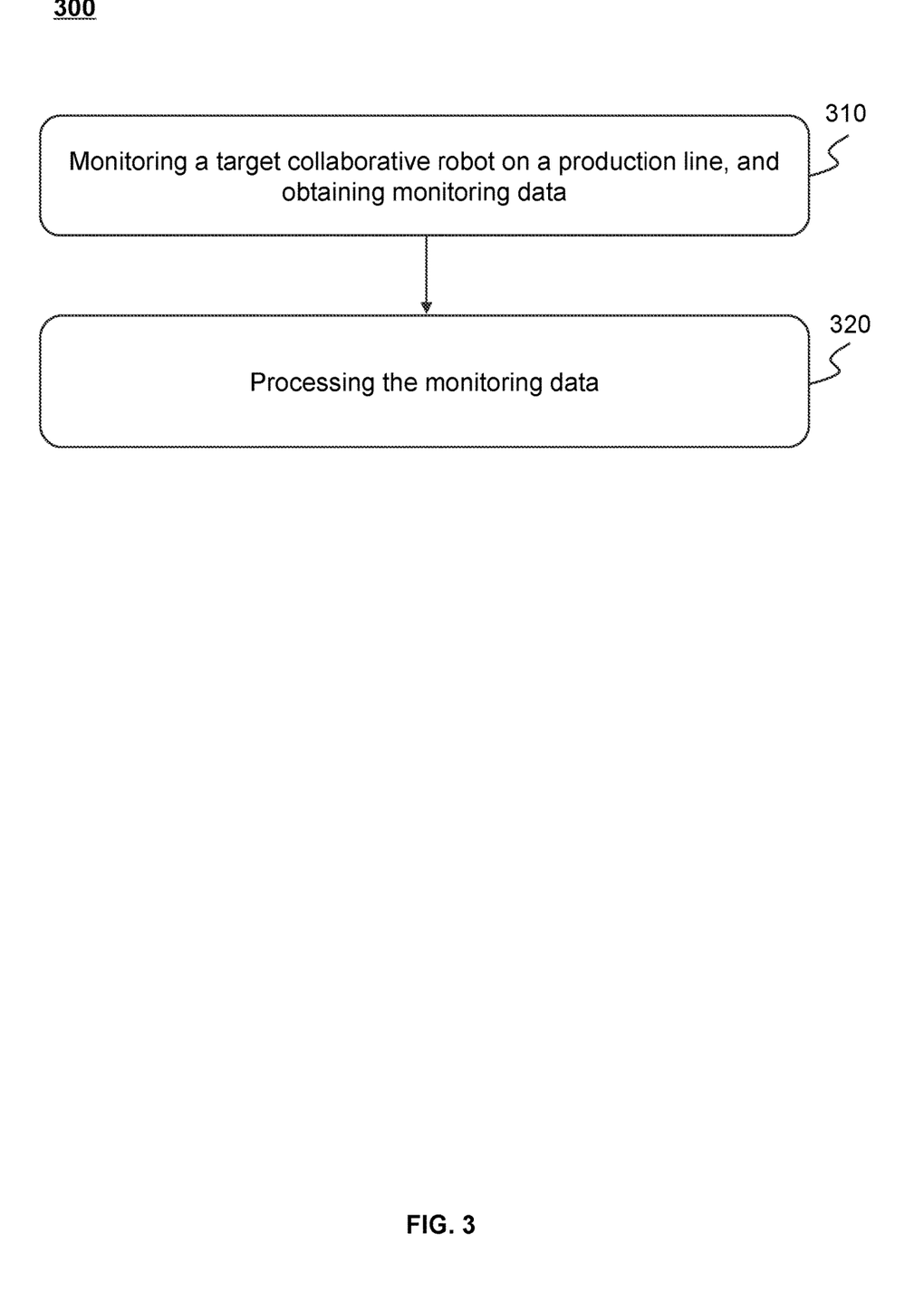
FIG. 3 is a flowchart illustrating an exemplary control method for an Industrial Internet of Things system for monitoring a collaborative robot with dual identification, according to some embodiments of the present disclosure.

FIG. 3 is a flowchart illustrating an exemplary control method for an Industrial Internet of Things system for monitoring a collaborative robot with dual identification, according to some embodiments of the present disclosure. As shown in FIG. 3, process 300 includes the following steps.

Step 310, monitoring a target collaborative robot on a production line, and obtaining monitoring data. In some embodiments, step 310 is performed by the monitoring module.

The collaborative robot is a robot that can work in collaboration with a human. For example, the collaborative robot may be a two-arm collaborative robot, a single-arm collaborative robot, etc. The target collaborative robot is a collaborative robot that needs to be monitored, e.g., a collaborative robot that is working.

The monitoring data refers to relevant data information obtained by monitoring the target collaborative robot. In some embodiments, the monitoring data may include at least one of image information of the target collaborative robot and displacement sensor data of the target collaborative robot.

The image information is image information associated with the target collaborative robot in a production processing situation. For example, a RGB image, a grayscale image, etc. In some embodiments, the image information may be 3D image information. In some embodiments, the image information may be obtained based on an image acquisition device. For example, the image information may be obtained based on a camera, a dual camera, an image scanner.

In some embodiments, the monitoring module may obtain, based on the image information, coordinates of a key point of the target collaborative robot in a collaborative robot space at a key moment in a production processing situation. For more information about the key moment and the coordinates of the key point in the collaborative robot space, please refer to FIG. 4 and its related description.

The displacement sensor data is sensor data associated with the displacement of a target collaborative robot in a production processing situation. The displacement sensor data may include displacement data and sensor usage data.

The displacement data is data associated with a position change of the target collaborative robot. For example, the displacement data may be data of a position change of a key point of the target collaborative robot at a key moment. The key point may be established in the collaborative robot space, the key point may include points of multiple joints of the collaborative robot. In some embodiments, the key point may be preset in advance based on experience or actual needs. The key moment is a moment in a processing cycle when the target collaborative robot is stationary. In some embodiments, the key moment may also be preset in advance based on experience or actual needs. For more information about the key point, the displacement data, the processing cycle, and the key moment, please refer to FIG. 4 and its associated description. In some embodiments, the displacement data may be obtained based on a displacement sensor.

The sensor usage data refers to usage data of the displacement sensor of the target collaborative robot in a production processing situation. The sensor usage data may include a usage time of the displacement sensor, a maintenance his-tory of the displacement sensor, etc. For example, the usage time of the displacement sensor may be 5 years, and the maintenance history of the displacement sensor may be 3 times of maintenance, the most recent maintenance being 1 month ago, etc. In some embodiments, the sensor usage data may be obtained based on historical usage data of a factory or a production line, historical maintenance data of the collaborative robot.

In some embodiments, the monitoring module may obtain coordinates of a key point of the target collaborative robot in a collaborative robot space at a key moment in a production processing situation based on the displacement sensor data. For more information about the coordinates, please refer to FIG. 4 and its related description.

In some embodiments, a sampling frequency of the image information and a sampling frequency of the displacement sensor data may be preset values and may be different. For more information about the sampling frequency of the image information and the sampling frequency of the displacement sensor data, please refer to FIG. 4 and its related description.

Step 320, processing the monitoring data. In some embodiments, step 320 is performed by the processing module.

In some embodiments, the processing module may analyze and process the monitoring data to determine a work situation of the target collaborative robot by using various data analysis algorithms, setting a preset rule, etc.

Exemplarily, the processing module may determine in advance corresponding historical data vectors based on historical image information and historical displacement sensor data from historical monitoring data of multiple collaborative robots, and generate a mapping relationship between the historical data vectors and historical actual work situations based on historical actual work situations corresponding to each historical data vector. The processing module may determine a corresponding data vector to be measured based on image information and displacement sensor data of a current target collaborative robot. Further, the processing module may determine, based on a vector distance (e.g., Euclidean distance) between a data vector to be measured and a historical data vector, at least one target historical data vector with the smallest vector distance from the data vector to be measured among the multiple historical data vectors. The processing module may use a historical actual work situation corresponding to the at least one target historical data vector as a current work situation of the target collaborative robot based on the mapping relationship.

In some embodiments, the processing module may be acted upon by the service platform and the management platform. The management platform may select at least one key moment from a processing cycle of the target collaborative robot; establish a collaborative robot space and to establish a key point of the collaborative robot in the collaborative robot space; take coordinates of the key point of the target collaborative robot in the collaborative robot space at the key moment in a standard processing situation as benchmark coordinates; monitor a work situation of the target collaborative robot based on a difference between the first coordinates, the second coordinates and the benchmark coordinates of the same key point at the same key moment, and to send the work situation to the user platform to display to the user via the service platform. For more information about the processing of the monitoring data through the management platform, please refer to FIG. 4 and its related description.

The method described in some embodiments of the present disclosure can obtain the monitoring data by monitoring the target collaborative robot on the production line, and then process the monitoring data, and based on the processing comparison of the image information of the target collaborative robot and the displacement sensor data of the target collaborative robot, efficiently and accurately determine whether the target collaborative robot is working normally in order to correct the operation of the target collaborative robot that is working abnormally, thereby saving manpower and material resources and improving the efficiency and yield rate of production.

Figure 4:
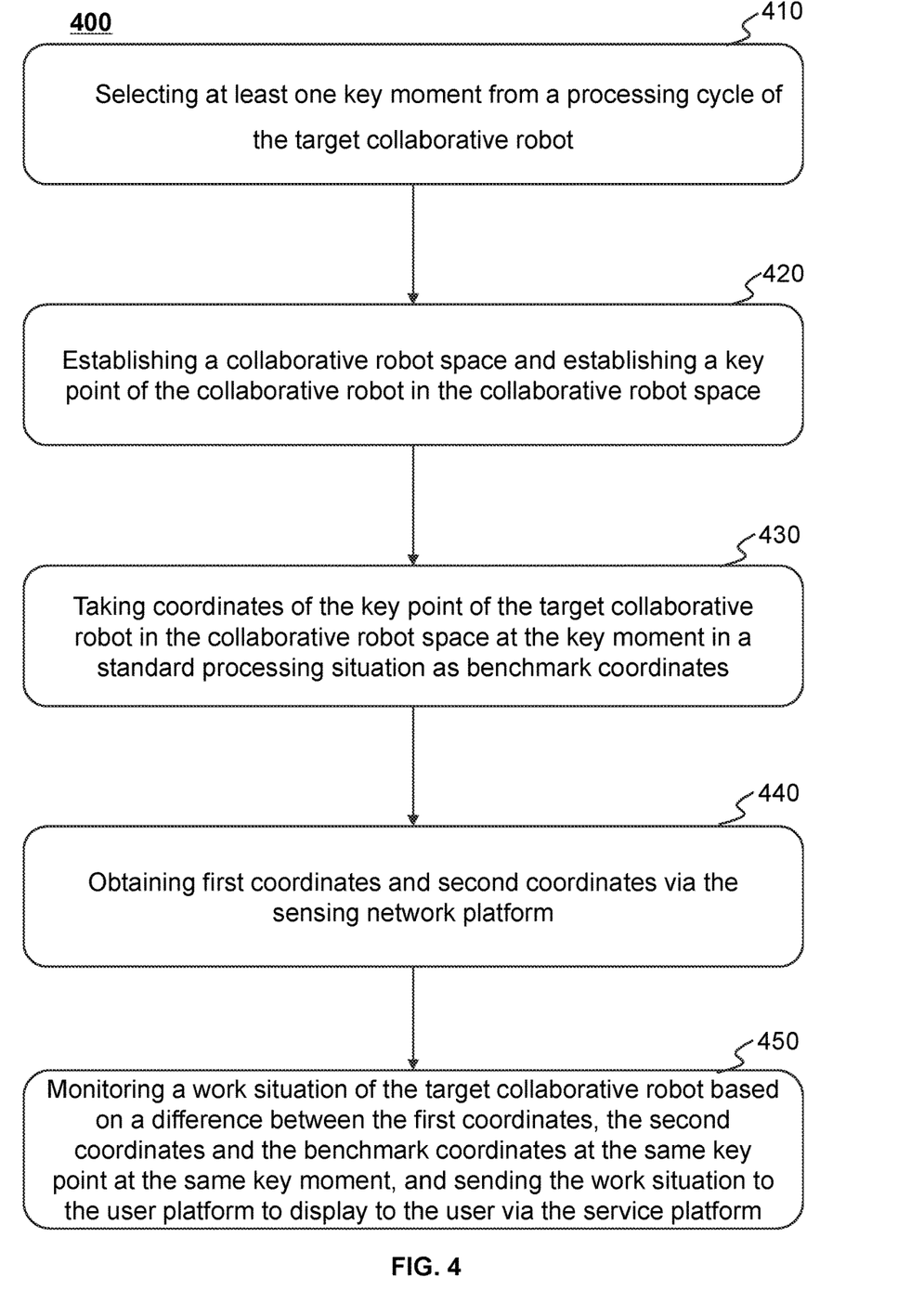
FIG. 4 is a flowchart illustrating an exemplary process for processing monitoring data according to some embodiments of the present disclosure.

FIG. 4 is a flowchart illustrating an exemplary process for processing monitoring data according to some embodiments of the present disclosure. As shown in FIG. 4, process 400 includes the following steps.

Step 410, selecting at least one key moment from a processing cycle of the target collaborative robot. In some embodiments, step 410 may be performed by a selection module.

The processing cycle is a time required for the target collaborative robot to complete a processing process on a workpiece. In some embodiments, the processing cycle may be preset in advance. For example, a calculation module may preset the processing cycle in advance based on a priori knowledge, historical data, actual user requirements, etc.

The key moment is a moment in the processing cycle when the target collaborative robot is stationary. The processing cycle may contain multiple key moments. In some embodiments, the key moment may be preset in advance. For example, the calculation module may preset the key moment in advance from the priori knowledge, the historical data, the actual user requirements, etc.

When the collaborative robot performs a processing work, there are pause moments in each processing step for stable operation. The pause moment is often at the millisecond level. The selection module may take this pause moment as a key moment to achieve alignment of time on the image information and the displacement sensor data.

The sampling frequency of the image information is often much smaller than the sampling frequency of the displacement sensor, so the difference between the image information and the displacement sensor data due to the sampling frequency can be minimized by selecting these pause moments. Exemplarily, the sampling frequency of the image information is typically 30 Hz. The sampling frequency of the displacement sensor is typically 2 kHz. The pause moment of the collaborative robot is typically 50 ms or more. So in the image information, there is at least one image that meets this pause moment, and the moment corresponding to this image is taken as the key moment, thus aligning with the displacement sensor data, which can effectively ensure the simultaneity of data sampling.

Step 420, establishing a collaborative robot space and establishing a key point of the collaborative robot in the collaborative robot space. In some embodiments, step 420 may be performed by a space module.

In some embodiments, the collaborative robot space may be a spatial coordinate system (e.g., a Cartesian coordinate system, a spherical coordinate system, etc.) established with an initial position of the collaborative robot as a coordinate origin. In some embodiments, the key point may include a point position of a joint of the collaborative robot.

Step 430, taking coordinates of the key point of the target collaborative robot in the collaborative robot space at the key moment in a standard processing situation as benchmark coordinates. In some embodiments, step 430 may be performed by a benchmark module.

Step 440, obtaining first coordinates and second coordinates via the sensing network platform. In some embodiments, step 440 may be performed by an acquisition module.

The first coordinates may be obtained from the image information. The first coordinates may be coordinates, in the image information, of a key point of the target collaborative robot in the collaborative robot space at a key moment in a production processing situation.

In some embodiments, the image information includes 3D image information. The acquisition module may photograph the target collaborative robot by a dual camera to form the 3D image information; extract coordinates of the key point from the 3D image information at each the key moment as 3D coordinates; and map the 3D coordinates into the collaborative robot space to form the first coordinates.

The second coordinates may be obtained from the displacement sensor data. The second coordinates may be coordinates, in the displacement sensor data, of a key point of the target collaborative robot in the collaborative robot space at a key moment in a production processing situation.

In some embodiments, the acquisition module may obtain displacement data of the key point of the target collaborative robot at the key moment in a production processing situation by the displacement sensor, the displacement sensor being configured at a joint of the target collaborative robot corresponding to the key point; calculate displacement sensor coordinates based on the displacement data and initial coordinates of the key point at the processing cycle; map the displacement sensor coordinates into the collaborative robot space to form the second coordinates.

It should be understood that in order to compare the data obtained by different sampling methods, the collaborative robot space is therefore used. The calculation module may take the coordinates of the key point of the target collaborative robot at the key moment in the image information as the first coordinates, the coordinates of the key point of the target collaborative robot at the key moment in the displacement sensor data as the second coordinates, and the coordinates of the corresponding key point at the key moment in the standard processing situation as the benchmark coordinates. By directly comparing the three aforementioned coordinates, monitoring and adjustment of the work situation of the target collaborative robot is realized, and it is possible to judge whether any of the image information and displacement sensor data is invalid.

The method described in some embodiments of the present disclosure enables monitoring and adjusting the operation of the collaborative robot by simultaneous monitoring of the image information and the displacement sensor data, effectively avoiding data errors that may be caused by monitoring collaborative robot through the displacement sensor only, and improving the production yield rate.

Step 450, monitoring a work situation of the target collaborative robot based on differences between the first coordinates, the second coordinates and the benchmark coordinates at the same key point at the same key moment, and sending the work situation to the user platform to display to the user via the service platform. In some embodiments, step 450 may be performed by the calculation module.

The work situation may reflect whether the target collaborative robot is in a normal working condition. For example, the work situation may be normal or abnormal. It can be understood that the target collaborative robot may be determined to be working abnormally when there is a deviation in its movements.

In some embodiments, the calculation module may obtain the first coordinates of all the key points at the same key moment to form first coordinate group and obtain the second coordinates of all the key points at the same key moment to form second coordinate group; calculate a coordinate value difference between the first coordinate group and the second coordinate group corresponding to the key points as a coordinate difference value of the key points; if the coordinate difference value is less than or equal to a first preset value, perform a first action, the first action including an action not to correct the image information and the displacement sensor; and if the coordinate difference value is greater than the first preset value, perform a second action, the second action being an action to correct the image information and/or the displacement sensor. The first preset value may be preset in advance based on historical experience or actual requirements.

It should be understood that if the key point coordinate difference value is less than or equal to the first preset value, it is determined that both the image information and the displacement sensor are working normally. Therefore, there is no need to correct the actions of the image information and the displacement sensor.

The method described in some embodiments of the present disclosure can determine whether the image information and/or the displacement sensor are distorted by the first coordinate group and the second coordinate group. Since the probability of both the image information and the displacement sensor being distorted at the same time is very small, the system may determine that one of the image information and the displacement sensor is distorted when there is a difference between the two, and a corresponding correction is required. When they are basically the same, i.e., the difference value of key point coordinates is less than or equal to the first preset value, the system may determine that both are working normally and no correction is needed.

In some embodiments, the calculation module may compare the second coordinate group with corresponding benchmark coordinates when the first action is performed; if a comparison result is in conformity, determine that the target collaborative robot is working normally at a current key moment; and if the comparison result is not in conformity, determine that at the current key moment the target collaborative robot is working abnormally, and correct an action of the target collaborative robot according to a difference between the second coordinate group and corresponding benchmark coordinates.

It should be understood that when it is determined that there is no need to correct the image information and the action of the displacement sensor, the calculation module may compare the second coordinate group with the corresponding benchmark coordinates and may determine whether the collaborative robot is working normally. Since the second coordinate group is obtained from the displacement sensor data, it theoretically leads to a higher sampling accuracy. So comparing the second coordinate group with the benchmark coordinates can obtain a more accurate comparison result.

In some embodiments, when performing the second action, the calculation module may input the current first coordinate group and the current benchmark coordinates to a distortion detection model and receive a distortion determination result output by the distortion detection model.

If the distortion determination result is distorted, it is determined that the first coordinate group is invalid and perform a distortion calibration of the image information, while comparing the second coordinate group with the corresponding benchmark coordinates; if the comparison result is in conformity, it is determined that the target collaborative robot is working normally at the current key moment; and if the comparison result is not in conformity, it is determined that the target collaborative robot is working abnormally at the current key moment and correct an action of the target collaborative robot based on the difference between the second coordinate group and the corresponding benchmark coordinates.

In some embodiments, the distortion calibration may include a dual camera real time alignment.

If the distortion determination result is not distorted, it is determined that the second coordinate group is invalid and calibrate a displacement sensor corresponding to the second coordinate group by the first coordinate group and compare the first coordinate group with the corresponding benchmark coordinates; if the comparison result is in conformity, it is determined that the target collaborative robot is working normally at the current key moment; and if the comparison result is not in conformity, it is determined that the target collaborative robot is working abnormally at the current key moment and correct the action of the target collaborative robot according to the difference between the first coordinate group and the corresponding benchmark coordinates.

In some embodiments, the correction may be to correct an action of the target collaborative robot to match the benchmark coordinates. Exemplarily, if second coordinates of a key point is (90, 30, 60) while the target collaborative robot performs the first action, and corresponding benchmark coordinates is (90, 30, 50), the calculation module may adjust a joint position corresponding to that key point downward by 10 coordinate values, typically by 10 mm.

In general, image information distortion and displacement sensor distortion appear to be distinctly and regularly distinct from a coordinate group perspective. The image information distortion tends to be a regular distortion occurring locally in the first coordinate group, while the displacement sensor distortion is an irregular distortion occurring at individual points in the second coordinate group. The method described in some embodiments of the present disclosure, based on the above principles, when performing the second action, the regularity exhibited by the first coordinate group is determined by the configured distortion detection model to be a distorted regularity, and if the first coordinate group is determined to be distorted, the image information is calibrated for distortion; at the same time, the work situation of the target collaborative robot is determined by the second coordinate group. And if the first coordinate group is not distorted, the second coordinate group is distorted, and the displacement sensor corresponding to the second coordinate group needs to be calibrated by the first coordinate group, and the work situation of the target collaborative robot is determined by the first coordinate group.

In some embodiments, the distortion detection model is configured to when receiving the current first coordinate group and the current benchmark coordinates, perform a distortion simulation of the benchmark coordinates based on multiple preset schemes and compare the current first coordinate group with a distortion simulation result; if the current first coordinate group is similar to any of the distortion simulation results, determine the distortion determination result is distorted; if the current first coordinate group is not similar to any of the distortion simulation results, determine the distortion determination result is not distorted.

In some embodiments, the distortion detection model is a pre-trained model.

The method described in some embodiments of the present disclosure, where distortion is simulated and compared to the benchmark coordinates by the distortion detection model based on a preset scheme, can effectively reduce the computational effort and is suitable for a real-time computational process.

The method described in some embodiments of the present disclosure reduces the impact of monitoring and adjustment of the collaborative robot due to displacement sensor errors or mistakes by synchronizing the monitoring of the image information and displacement sensor data and comparing a well-defined moment (e.g., a key moment) with the coordinate space, thereby enabling comparison of the image information and the data generated by the displacement sensor, and improving the efficiency and yield of production.

Figure 5:
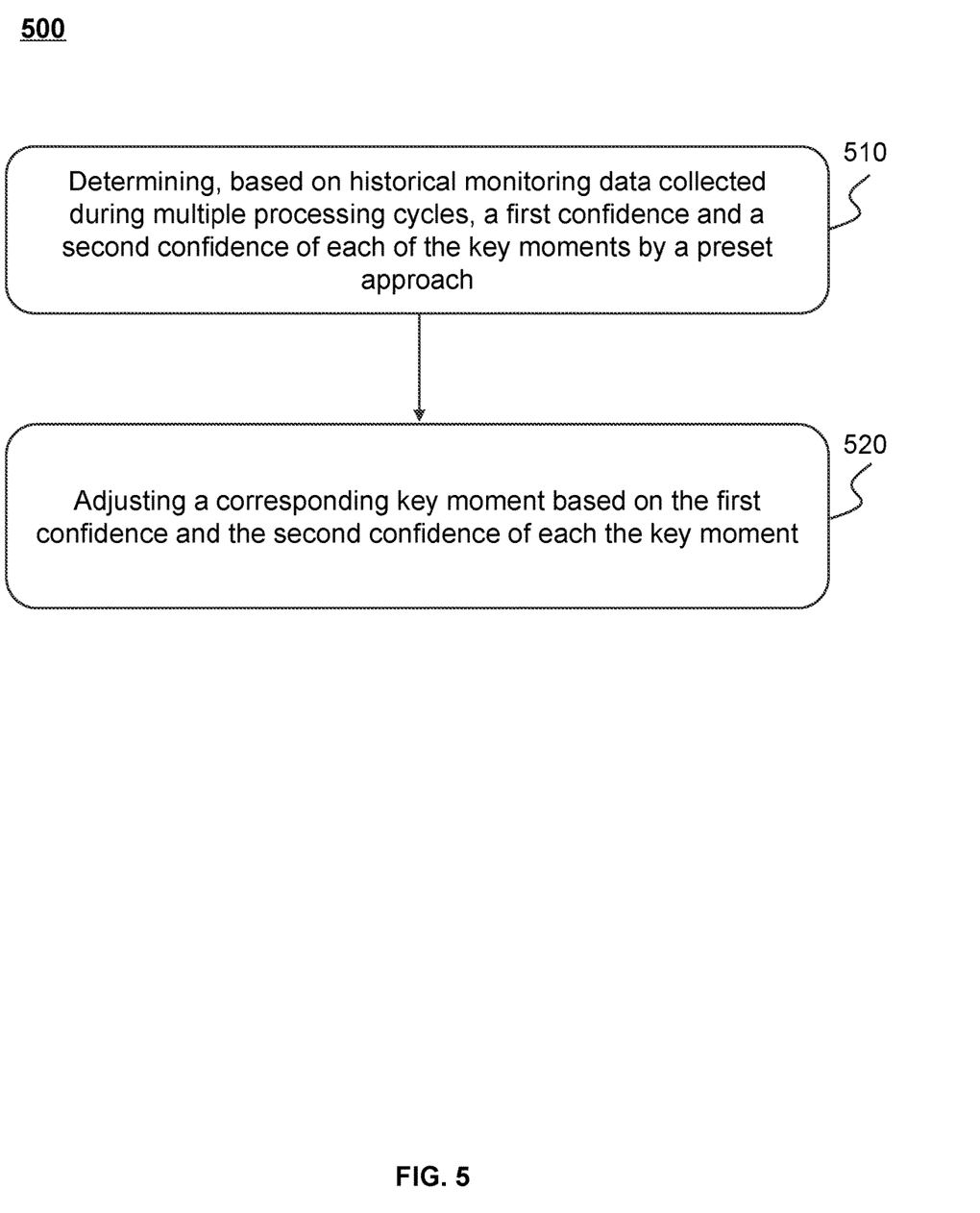
FIG. 5 is a flowchart illustrating an exemplary process for determining a key moment, according to some embodiments of the present disclosure.

FIG. 5 is a flowchart illustrating an exemplary process for determining a key moment, according to some embodiments of the present disclosure. As shown in FIG. 5, process 500 includes the following steps. The process 500 may be performed by the calculation module.

Step 510, determining, based on historical monitoring data collected during multiple processing cycles, a first confidence and a second confidence of each of the key moments by a preset approach.

For more information about the processing cycle, please refer to FIG. 4 and its related description.

The historical monitoring data refers to historical data information associated with the target collaborative robot. The historical monitoring data may include historical image information of the target collaborative robot and historical displacement sensor data of the target collaborative robot. For more information about the image information, displacement sensor data, please refer to FIG. 3 and its related description.

For more information about the key moment, please refer to FIG. 4 and its related description.

The first confidence refers to a confidence of the first coordinates based on a collection of image information. In some embodiments, the first confidence may also be a confidence of the first coordinate group.

The second confidence is a confidence of the second coordinates based on a collection of the displacement sensor data. In some embodiments, the second confidence may also be a confidence of the second coordinate group.

For more information about the first coordinates, the second coordinate, the first coordinate group, and the second coordinate group, please refer to FIG. 4 and its related description.

In some embodiments, the calculation module may determine a first confidence and a second confidence of each key moment by the preset approach. Each key moment corresponds to first coordinates and second coordinates. A confidence of the first coordinates corresponding to the key moment is the first confidence of the key moment. A confidence of the second coordinates corresponding to the key moment is the second confidence of the key moment.

In some embodiments, the calculation module determines the first confidence and the second confidence of the key moment by establishing a correspondence, a model, and/or manual experience, etc. For example, the calculation module may generate a first correspondence between the historical monitoring data and a historical first confidence with a historical second confidence based on the historical monitoring data and the corresponding historical first confidence and historical second confidence. Accordingly, the calculation module may determine the historical first confidence and historical second confidence corresponding to the historical monitoring data that are the same as or similar to the current key moment monitoring data and use them as a current first confidence and second confidence based on the current key moment monitoring data.

In some embodiments, the calculation module may calculate a variance of multiple coordinate values corresponding to the same key point at the same key point at the key moment in the multiple processing cycles based on data of the same key point at a key moment corresponding to each of the multiple processing cycles; and determine a confidence of the key moment according to a preset second correspondence based on the variance of the multiple coordinate values corresponding to the same key point at the key moment, an exemplary calculation process of the variance of the multiple coordinate values corresponding to the same key point at the key moment is as follows:

Assuming that the key points of the collaborative robot are A, B, and C, the calculation module may extract data of 10 processing cycles and determine that the key moment corresponding to each of the 10 processing cycles is $T_1$ (e.g., the first stationary moment of the target collaborative robot in the processing cycle).

At the key moment $T_1$, the first coordinates of the key point A captured based on the image information are $(X_{Ai}^1, Y_{Ai}^1, Z_{Ai}^1), (X_{Ai}^2, Y_{Ai}^2, Z_{Ai}^2), (X_{Ai}^3, Y_{Ai}^3, Z_{Ai}^3) \ldots (X_{Ai}^{10}, Y_{Ai}^{10}, Z_{Ai}^{10})$. $(X_{Ai}^1, Y_{Ai}^1, Z_{Ai}^1)$ represent the coordinates of the key point A at the key moment $T_1$ of the first processing cycle, based on the image information. The calculation module can calculate the variance $SX_{Ai}$ for $X_{A1}^1, X_{Ai}^2, X_{Ai}^3, \ldots, X_{Ai}^{10}$, the variance $SY_{Ai}$ for $Y_{Ai}^1, Y_{Ai}^2, Y_{Ai}^3, \ldots, Y_{Ai}^{10}$, the variance $SZ_{Ai}$ for $Z_{Ai}^1, Z_{Ai}^2, Z_{Ai}^3, \ldots, Z_{Ai}^{10}$. The calculation module may average the three variances $SX_{Ai}, SY_{Ai}$ and $SZ_{Ai}$ as the first coordinate variance $V_A^1$ of the key point A based on the collection of the image information at the key moment $T_1$.

At the key moment $T_1$, the first coordinates of the key point A based on the collection of the displacement sensor data are $(X_{Ad}^1, Y_{Ad}^1, Z_{Ad}^1), (X_{Ad}^2, Y_{Ad}^2, Z_{Ad}^2), (X_{Ad}^3, Y_{Ad}^3, Z_{Ad}^3) \ldots (X_{Ad}^{10}, Y_{Ad}^{10}, Z_{Ad}^{10})$. $(X_{Ad}^1, Y_{Ad}^1, Z_{Ad}^1)$ represents the coordinates of the key point A at the key moment T1 of the first processing cycle, based on the displacement sensor data. The calculation module can calculate the variance $SX_{Ad}$ for $X_{Ad}^1, X_{Ad}^2, X_{Ad}^3, \ldots, X_{Ad}^{10}$, the variance $SY_{Ad}$ for $Y_{Ad}^1, Y_{Ad}^2, Y_{Ad}^3, \ldots, Y_{Ad}^{10}$, the variance $SZ_{Ad}$ for $Z_{Ad}^1, Z_{Ad}^2, Z_{Ad}^3, \ldots, Z_{Ad}^{10}$. The calculation module can average the three variances of $SX_{Ad}, SY_{Ad}$ and $SZ_{Ad}$ as the second coordinate variance $V_A^2$ of the key point A based on the collection of the displacement sensor data at the key moment $T_1$.

In some embodiments, the calculation module may weight the sum of the first coordinate variances of all key points at that key moment as the first coordinate variance at that key moment. Similarly to the first coordinates, the calculation module may weight the sum of the second coordinate variances of all key points at that key moment as the second coordinate variances at that key moment.

For example, at the key moment $T_1$, the first coordinate variances of the key points A, B, and C are $V_A^1, V_B^1, V_C^1$, respectively, and the second coordinate variances of the key points A, B, and C are $V_A^2, V_B^2, V_C^2$, respectively. The weights of $V_A^1, V_B^1, V_C^1$ and $V_A^2, V_B^2, V_C^2$ may represent the importance of key points A, B, and C with respect to the first confidence and the second confidence. The weights of $V_A^1, V_B^1, V_C^1$ and $V_A^2, V_B^2, V_C^2$ may be preset in advance based on experience or practical needs. For example, the weights of the first coordinate variance and the second coordinate variance of the same key point may be the same, e.g., if the weight of $V_A^1$ is 30%, the weight of $V_B^1$ is 30%, and the weight of $V_C^1$ is 40%, and the weight of $V_A^2$ is 30%, the weight of $V_B^2$ is 30%, and the weight of $V_C^2$ is 40%, then the first coordinate variance $V^1$ of the key moment $T_1$ may be $V_A^1*30\%+V_B^1*30\%+V_C^1*40\%$, the second coordinate variance $V^2$ of the key moment $T_1$ may be $V_A^2*30\%+V_B^2*30\%+V_C^2*40\%$.

In some embodiments, the calculation module may determine the first confidence and the second confidence of the key moment based on the first coordinate variance and the second coordinate variance of the current key moment based on the preset second correspondence. For example, the calculation module may generate the second correspondence between the historical first coordinate variance and the historical first confidence as well as the historical second coordinate variance and the historical second confidence based on the historical first coordinate variance and the corresponding historical first confidence as well as the historical second coordinate variance and the corresponding historical second confidence. Accordingly, the calculation module may determine the historical first confidence and the historical second confidence corresponding to the first coordinate variance and the second coordinate variance of the current key moment that are the same as or similar to the first coordinate variance and the second coordinate variance of the current key moment based on the first coordinate variance, the second coordinate variance and the second correspondence, and use the historical first confidence and the historical second confidence as the current first confidence and the second confidence.

The method described in some embodiments of the present disclosure, as the processing cycle is repeated, at the same key moment of each processing cycle, the collaborative robot can obtain coordinates by images or sensors, and by calculating the variance for each key point at the same key moment of multiple consecutive processing cycles based on the data of the historical multiple processing cycles, and then measuring the confidence of the first coordinates and second coordinates of the collaborative robot at the key moment by the variance, such as the confidence of its collected coordinates at the key moment of the excessive degree of historical variation is low.

In some embodiments, the first confidence may also be related to a historical distortion rate of the image collection.

The historical distortion rate refers to a probability that historical images are distorted in a historical image collection. In some embodiments, for the historical first coordinate group obtained at each key moment of the historical image collection, the calculation module may determine whether the historical images are distorted by a distortion model. For more information about the distortion model, please refer to FIG. 4 and its related description.

In some embodiments, the historical distortion rate may be determined based on a number of distortions of the historical first coordinate group and a total number of historical first coordinate groups. For example, the historical distortion rate=the number of distortions of the historical first coordinate group/the total number of historical first coordinate groups.

In some embodiments, the first confidence may be negatively correlated with the historical distortion rate. The greater the historical distortion rate is, the lower the first confidence is. For example, the calculation module may determine a final first confidence from a difference between the first confidence determined by the second correspondence and the historical distortion rate. Exemplarily, the final first credibility=the first confidence determined by the second correspondence−a*historical distortion rate, wherein a is an impact factor, 0<a≤1, and a may be a value preset in advance.

Figure 6:
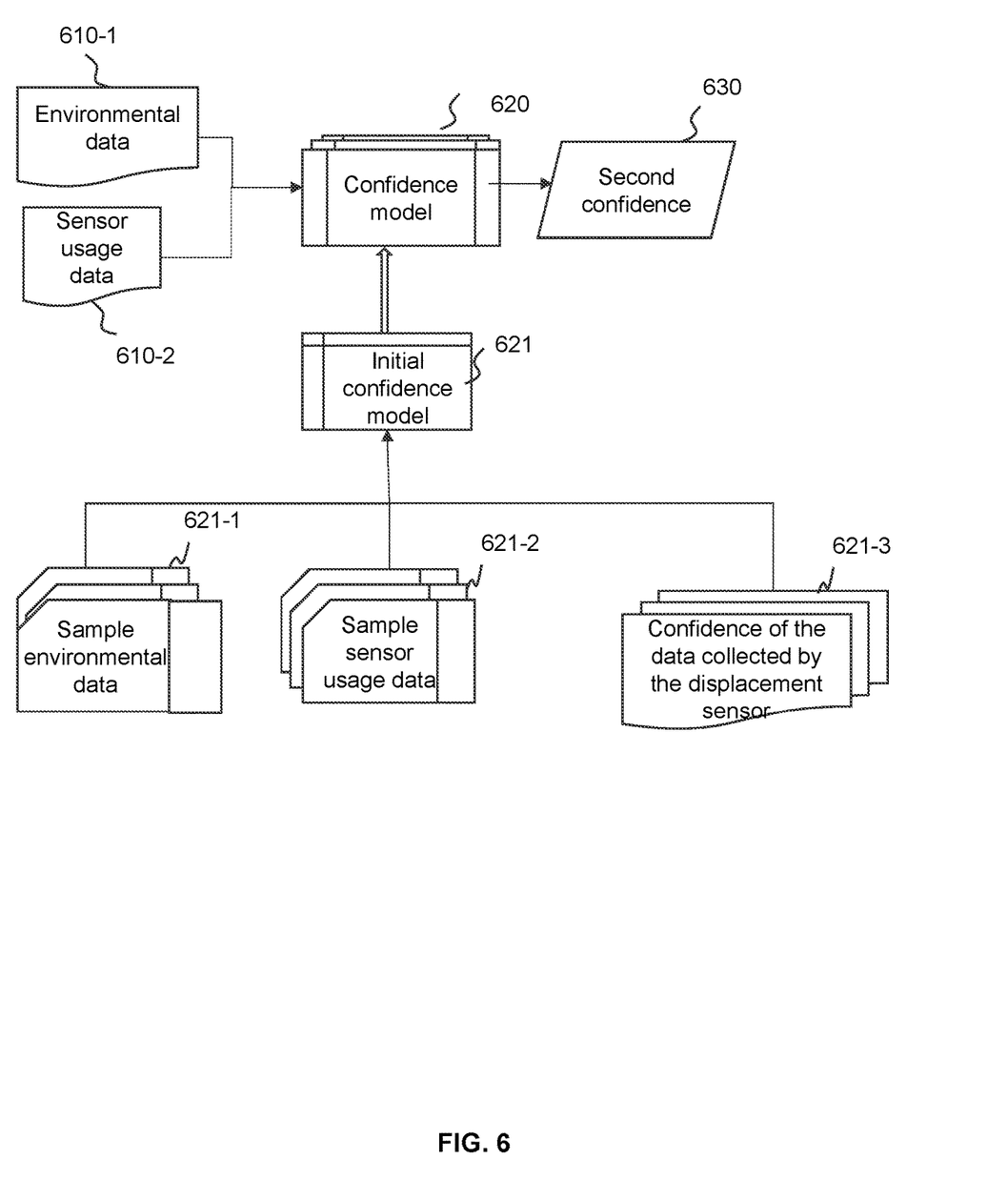
FIG. 6 is a schematic diagram illustrating a confidence model according to some embodiments of the present disclosure.

In some embodiments, the second confidence may also be determined based on a confidence model. FIG. 6 is a schematic diagram illustrating a confidence model according to some embodiments of the present disclosure.

In some embodiments, the confidence model is a machine learning model. The confidence model may be used to determine the second confidence. The confidence model may be one or more of a convolutional neural network model, a recurrent neural network model, etc.

As shown in FIG. 6, an input of the confidence model 620 may be environmental data 610-1, sensor usage data 610-2, and an output may be a second confidence 630.

The environmental data refers to environmental data around the target collaborative robot in a production processing situation. The environmental data may include temperature data, humidity data, etc. In some embodiments, the temperature data may be obtained by a thermometer, a temperature sensor, etc., set in the production environment. The humidity data may be obtained by a humidity sensor set in the production environment.

The sensor usage data refers to usage data of the displacement sensor of the target collaborative robot in a production processing situation. The sensor usage data may include usage time of the displacement sensor, maintenance history of the displacement sensor, etc. For more information about the sensor usage data, please refer to FIG. 3 and its related description.

In some embodiments, the second confidence output by the confidence model may serve as the confidence of the data (e.g., displacement data) collected by the displacement sensor at each key moment.

In some embodiments, a parameter of the confidence model may be obtained by training. As shown in FIG. 6, the calculation module may train an initial confidence model 621 with multiple sets of training samples with labels. Each set of training samples may include sample environmental data 621-1 and sample sensor usage data 621-2. The label of each set of training samples may be a confidence 621-3 of the data collected by the displacement sensor.

In some embodiments, the calculation module may input the multiple training samples with labels into the initial confidence model, construct a loss function from the labels and a result of the initial confidence model, and iteratively update the parameter of the initial confidence model based on the loss function. The model training is completed when the loss function of the initial confidence model meets a preset condition, and the trained confidence model is obtained. The preset condition may be the convergence of the loss function, the number of iterations reaching the threshold, etc.

The method described in some embodiments of the present disclosure for determining the second confidence by the confidence model enables intelligent prediction based on the environmental data and the sensor usage data, and improves the veracity and accuracy of the confidence model for determining the second confidence.

In some embodiments, the calculation module may determine a final second confidence from the second confidence determined by the second correspondence relationship with the second confidence determined by the confidence model. For example, the final second confidence=b*second confidence determined by the second correspondence+c*second confidence determined by the confidence model, where b, c are influence factors and b+c=1. b, c may be preset values.

Step 520, adjusting a corresponding key moment based on the first confidence and the second confidence of each the key moment.

In some embodiments, the calculation module may adjust the key moment based on the first confidence, the second confidence.

In some embodiments, in response to a key moment having a first confidence and a second confidence that are less than a threshold, the calculation module may remove the moment from the key moment. The threshold may be preset.

The method described in some embodiments of the present disclosure may be adjusted by the first confidence and the second confidence for the corresponding key moment to screen unnecessary key moments, which may facilitate subsequent more accurate determination of the work of the target collaborative robot.

In some embodiments, the calculation module may determine a target coordinate group to ultimately compare to the benchmark coordinates based on the first confidence and the second confidence at each key moment. For more information about the benchmark coordinates, please refer to FIG. 4 and its related description. In some embodiments, the second confidence may be determined based on the aforementioned multiple processing cycles.

The target coordinate group is a group of coordinates that is determined to be ultimately used to compare with the benchmark coordinates. The target coordinate group may include a first coordinate group and a second coordinate group.

In some embodiments, in response to a coordinate difference value of the first coordinate group and the second coordinate group being less than or equal to a first preset value, a first action is performed to select a coordinate group with a high confidence from the first coordinate group and the second coordinate group as the target coordinate group. The confidence of the first coordinate group may be the first confidence of the key moment, and the confidence of the second coordinate group may be the second confidence of the aforementioned key moment.

The coordinate difference values of the first coordinate group and the second coordinate group are the coordinate value differences of the key points corresponding to the first coordinate group and the second coordinate group. For more information about the coordinate value difference values of the key points, please refer to FIG. 4 and its related description.

By determining the final target coordinate group to compare with the benchmark coordinates based on the first confidence and the second confidence at each key moment as described in some embodiments of the present disclosure, the determined target coordinate group may be made more reasonable, thus making it more accurate to determine whether the target collaborative robot is working normally.

By determining the first confidence and the second confidence of each key moment, i.e., the respective confidence of image collection and sensor collection, based on the historical monitoring data collected in the multiple processing cycles as described in some embodiments of the present disclosure, the corresponding key moment may be adjusted by the first confidence and the second confidence to screen unnecessary key moments, thereby determining more efficiently and accurately whether the target collaborative robot is working normally, saving human and material resources and improving the efficiency and yield of production.

Embodiments of the present disclosure also provide a non-transitory computer-readable storage medium, comprising a set of instructions, wherein when executed by a processor, a control method for an Industrial Internet of Things system for monitoring a collaborative robot with dual identification as provided in any one of the embodiments of the present disclosure.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments.

In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. An Industrial Internet of Things system for monitoring a collaborative robot with dual identification, comprising: a service platform, a management platform, a sensing network platform connected in turn, wherein the management platform comprises:
   a selection module configured to select at least one key moment from a processing cycle of a target collaborative robot; the processing cycle being a processing process of the target collaborative robot for a workpiece; the key moment being a moment in the processing cycle when the target collaborative robot is stationary;
   a space module configured to establish a collaborative robot space and to establish a key point of a collaborative robot in the collaborative robot space; the key point including a point of a joint of the collaborative robot;
   a benchmark module configured to take coordinates of a key point of the target collaborative robot in the collaborative robot space at the key moment in a standard processing situation as benchmark coordinates;
   an acquisition module configured to obtain first coordinates and second coordinates via the sensing network platform; the first coordinates being coordinates of the key point of the target collaborative robot in the collaborative robot space at the key moment in a production processing situation and being obtained from image information; the second coordinates being coordinates of the key point of the target collaborative robot in the collaborative robot space at the key moment in the production processing situation and being obtained from displacement sensor data; and
   a calculation module configured to monitor a work situation of the target collaborative robot based on a difference between the first coordinates, the second coordinates and the benchmark coordinates of the same key point at the same key moment, and to send the work situation to a user platform to display to a user via the service platform;
   the acquisition module is further configured to:
      photograph the target collaborative robot by a dual camera to form 3D image information;
      extract coordinates of the key point from the 3D image information at the key moment as 3D coordinates; and
      map the 3D coordinates into the collaborative robot space to form the first coordinates;
      obtain displacement data of the key point of the target collaborative robot at the key moment in the production processing situation by a displacement sensor, the displacement sensor being configured at a joint of the target collaborative robot corresponding to the key point;
      calculate displacement sensor coordinates based on the displacement data and initial coordinates of the key point at the processing cycle; and
      map the displacement sensor coordinates into the collaborative robot space to form the second coordinates; and
   the calculation module is further configured to:
      obtain first coordinates of all key points at the same key moment to form a first coordinate group and obtain second coordinates of all key points at the same key moment to form a second coordinate group;
      calculate a coordinate value difference between the first coordinate group and the second coordinate group corresponding to each of the key points as a coordinate difference value of each of the key points; and
      if the coordinate difference value is less than or equal to a first preset value, perform a first action, the first action including an action not to correct the image information and the displacement sensor; or
      if the coordinate difference value is greater than the first preset value, perform a second action, the second action being an action to correct the image information and/or the displacement sensor.

2. The Industrial Internet of Things system of claim 1, wherein the calculation module is further configured to: when the first action is performed, compare the second coordinate group with corresponding benchmark coordinates to obtain a comparison result;
   and if the comparison result is in conformity, determine that the target collaborative robot is working normally at a current key moment; or if the comparison result is not in conformity, determine that at the current key moment, the target collaborative robot is working abnormally, and correct an action of the target collaborative robot according to a difference between the second coordinate group and corresponding benchmark coordinates.

3. The Industrial Internet of Things system of claim 1, wherein the calculation module is further configured to: when the second action is performed, input a current first coordinate group and a current benchmark coordinates to a distortion detection model and receive a distortion determination result output by the distortion detection model; if the distortion determination result is distorted, determine that the first coordinate group is invalid and perform a distortion calibration of the image information, and compare the second coordinate group with the corresponding benchmark coordinates; and if the comparison result is in conformity, determine that the target collaborative robot is working normally at a current key moment; or if the comparison result is not in conformity, determine that the target collaborative robot is working abnormally at the current key moment and correct an action of the target collaborative robot based on the difference between the second coordinate group and the corresponding benchmark coordinates; or if the distortion determination result is not distorted, determine that the second coordinate group is invalid and calibrate a displacement sensor corresponding to the second coordinate group by the first coordinate group, and compare the first coordinate group with the corresponding benchmark coordinates; and if the comparison result is in conformity, determine that the target collaborative robot is working normally at the current key moment; or if the comparison result is not in conformity, determine that the target collaborative robot is working abnormally at the current key moment and correct the action of the target collaborative robot according to the difference between the first coordinate group and the corresponding benchmark coordinates.

4. The Industrial Internet of Things system of claim 3, wherein the distortion detection model is configured to: when receiving the first coordinate group and the benchmark coordinates, perform a distortion simulation of the benchmark coordinates based on multiple preset schemes and compare the first coordinate group with a distortion simulation result; and if the first coordinate group is similar to the distortion simulation result, determine the distortion determination result is distorted; or if the current first coordinate group is not similar to the distortion simulation result, determine the distortion judgment result is not distorted.

5. The Industrial Internet of Things system of claim 1, wherein the sensing network platform includes a sensing network master platform and at least two sensing network sub-platforms, the sensing network master platform receiving the image information of the target collaborative robot and the displacement sensor data of the target collaborative robot; the different sensing network sub-platforms sending the image information and the displacement sensor data to the management platform, respectively; the management platform includes a management master platform and at least two management sub-platforms, the management sub-platforms obtaining the image information and the displacement sensor data, respectively, and processing the image information into the first coordinates and the displacement sensor data into the second coordinates, respectively; the selection module, the space module, the benchmark module, the acquisition module and the calculation module being provided in the management master platform, and the management master platform receiving the first coordinates and the second coordinates sent by the management sub-platforms; the service platform includes a service master platform and at least two service sub-platforms; the service master platform receives data sent by the management platform and sends different data to the user platform through the service sub-platforms to display to the user.

6. A control method for an Industrial Internet of Things system for monitoring a collaborative robot with dual identification, wherein the Industrial Internet of Things system comprises: a service platform, a management platform, a sensing network platform connected in turn, and the management platform comprises a selection module, a space module, a benchmark module, an acquisition module, a calculation module, the control method comprising:
selecting, by the selection module, at least one key moment from a processing cycle of a target collaborative robot; the processing cycle being a processing process of the target collaborative robot for a workpiece; the key moment being a moment in the processing cycle when the target collaborative robot is stationary;
establishing, by the space module, a collaborative robot space and a key point of a collaborative robot in the collaborative robot space; the key point including a point of a joint of the collaborative robot;
taking, by the benchmark module, coordinates of a key point of the target collaborative robot in the collaborative robot space at the key moment in a standard processing situation as benchmark coordinates;
obtaining, by the acquisition module, first coordinates and second coordinates via the sensing network platform; the first coordinates being coordinates of the key point of the target collaborative robot in the collaborative robot space at the key moment in a production processing situation and being obtained from image information; the second coordinates being coordinates of the key point of the target collaborative robot in the collaborative robot space at the key moment in a production processing situation and being obtained from displacement sensor data; and
monitoring, by the calculation module, a work situation of the target collaborative robot based on a difference between the first coordinates, the second coordinates and the benchmark coordinates of the same the key point at the same key moment, and sending the work situation to a user platform to display to a user via the service platform.

7. The control method of claim 6, wherein the monitoring a work situation of the target collaborative robot based on a difference between the first coordinates, the second coordinates and the benchmark coordinates at the same the key point at the same key moment includes: obtaining first coordinates of all key points at the same the key moment to form a first coordinates group and obtain second coordinates of all key points at the same the key moment to form a second coordinates group; calculating a coordinate value difference between the first coordinate group and the second coordinate group corresponding to each of the key points as a coordinate difference value of each of the key points; and if the coordinate difference value is less than or equal to a first preset value, performing a first action, the first action including an action not to correct the image information and the displacement sensor; or if the coordinate difference value is greater than the first preset value, performing a second action, the second action being an action to correct the image information and/or the displacement sensor.

* * * * *